US012031261B2

(12) United States Patent
Kessler et al.

(10) Patent No.: US 12,031,261 B2
(45) Date of Patent: Jul. 9, 2024

(54) METHOD AND DEVICE FOR DISPENSING A FRAGRANCE COMPOSITION DURING A CLEANING CYCLE OF A HOUSEHOLD APPLIANCE

(71) Applicant: Henkel AG & Co. KGaA, Duesseldorf (DE)

(72) Inventors: Arnd Kessler, Monheim am Rhein (DE); Ingo Hardacker, Hamminkeln (DE); Slavoljub Barackov, Monheim (DE); Andreas Bauer, Kaarst (DE); Frank Pessel, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 462 days.

(21) Appl. No.: 17/125,161

(22) Filed: Dec. 17, 2020

(65) Prior Publication Data

US 2021/0189631 A1 Jun. 24, 2021

(30) Foreign Application Priority Data

Dec. 19, 2019 (EP) .................................... 19217831

(51) Int. Cl.

| | |
|---|---|
| ***D06F 39/04*** | (2006.01) |
| ***C11D 1/62*** | (2006.01) |
| ***C11D 3/50*** | (2006.01) |
| ***D06F 39/02*** | (2006.01) |
| *D06F 103/20* | (2020.01) |

(52) U.S. Cl.

CPC .............. *D06F 39/024* (2013.01); *C11D 1/62* (2013.01); *C11D 3/50* (2013.01); *D06F 2103/20* (2020.02)

(58) Field of Classification Search

CPC ..... D06F 39/024; D06F 2103/20; C11D 3/50; C11D 1/62

See application file for complete search history.

(56) References Cited

U.S. PATENT DOCUMENTS

2002/0088502 A1* 7/2002 Van Rompuy ........ D06F 39/024 141/1

FOREIGN PATENT DOCUMENTS

| | | | | |
|---|---|---|---|---|
| DE | 102017218196 A1 * | 4/2019 | | D06F 33/37 |
| DE | 102017218196 A1 | 4/2019 | | |
| DE | 102017223221 A1 | 6/2019 | | |
| WO | 2011131256 A1 | 10/2011 | | |
| WO | WO-2011138218 A1 * | 11/2011 | | C11D 17/046 |
| WO | WO-2014174272 A1 * | 10/2014 | | C11D 1/62 |
| WO | 2019170819 A1 | 9/2019 | | |

* cited by examiner

*Primary Examiner* — Jason Y Ko

(74) *Attorney, Agent, or Firm* — Lorenz & Kopf, LLP

(57) ABSTRACT

A method and device for dispensing a fragrance composition in a household appliance during a cleaning cycle. The device is disposed inside the appliance and includes a first compartment with a detergent, and a second compartment with a fragrance composition. A change in a position of the device in the appliance triggers dispensing of a portion of the fragrance into the appliance. The device can contain computer instructions for carrying out the methods.

8 Claims, 3 Drawing Sheets

METHOD AND DEVICE FOR DISPENSING A FRAGRANCE COMPOSITION DURING A CLEANING CYCLE OF A HOUSEHOLD APPLIANCE

CROSS-REFERENCE TO RELATED APPLICATION

This application claims priority to European Patent Application No. EP19217831, filed Dec. 19, 2019, which is incorporated herein by reference in its entirety.

TECHNICAL FIELD

The present disclosure relates to the field of methods to dispense a fragrance composition in a household appliance in order to eliminate malodor on items that are cleaned. The method and device of the present disclosure can in particular be used in dishwashers, washing machines, dryers or irons. It is however mostly usable in dishwashers, washing machines or dryers.

TECHNOLOGICAL BACKGROUND

While or after a cleaning cycle is performed on items in a household appliance, a fragrance composition is generally dispensed in order to improve the overall scent of the items. The pleasant scent provided by the fragrance composition reinforces the impression of a successful cleaning operation.

Generally fragrance compositions are part of the constituents that make up a cleaning agent that is introduced in the housing of a household appliance. Cleaning agents are generally in the form of powders, granules, tabs, pouches or liquids that comprise a mixture of cleaning chemicals and one or more fragrances.

Such cleaning agents therefore dispense the fragrance composition at the same time as the other active chemicals, typically surfactants. However, surfactants do not make any distinction between the soilings on items to be cleaned and the molecules of the fragrance composition. Therefore, fragrances contained in powders, granules, tabs, pouches or liquids are generally dissolved at least in part by surfactants during the cleaning treatment and are less efficient in improving the overall smell of the items.

In order to better time the release of the fragrance composition into the housing of a household appliance it is also known to encapsulate the fragrance composition in microcapsules. These microcapsules adhere to the surface of the items to be cleaned and release the fragrance composition only during a rinse cycle or at the end of the cleaning cycle. This improves the scent of the items at the end of the cleaning cycle but has the disadvantage of adding an undesired additive that makes up the microcapsules, generally containing polymers such as melamine-formaldehyde condensates. These materials are detrimental to the environment.

Some dosing devices such as the one described in document WO2011131256 A1, enable storage of the fragrance composition in a cartridge that is separated from the other cleaning agents so that the fragrance composition can be dispensed during a rinse cycle that comprises fewer surfactants than the main wash cycle. However, the dispensing of the fragrance composition occurs once, and the fragrance composition tends to concentrate near the items that are located closer to the dispensing device. As a result, some items have a stronger scent than others, or the scent may spread non homogeneously over the surface of an item. This confuses users and can give the impression that the cleaning was not successful.

For the above reasons, a method for dispensing a fragrance composition in a household appliance that overcomes the deficiencies listed above is sought, as well as a device for dispensing said fragrance composition.

SUMMARY

To address the above need, the present disclosure provides a method for dispensing a fragrance composition into a main cavity of a household appliance during a cleaning cycle of the household appliance, the cleaning cycle comprising a wash cycle during which a detergent is dispensed into the main cavity and at least one rinse cycle, the detergent being comprised in a first compartment of a mobile dispensing device configured to be movably arranged inside the main cavity of the household appliance, the method comprising:

- storing the fragrance composition in a second compartment of the mobile dispensing device, the second compartment being separated from the first compartment of the dispensing device;
- determining a change in a position of the mobile dispensing device in the main cavity; and
- dispensing at least one portion of the fragrance composition from the second compartment into the main cavity at least twice during the at least one rinse cycle so that the position of the mobile dispensing device in the main cavity at a first dispensing time differs from the position of the mobile device in the main cavity at a second dispensing time.

By storing the detergent and the fragrance composition in two separate compartments, such as for example in separate cartridges, the method enables a control of the time of the release of each of these cleaning agents during the cleaning cycle in the household appliance.

Furthermore, by determining changes in the position of the mobile dispensing device which contains the fragrance composition, the fragrance composition can be dispensed in a more homogeneous way, by dispensing only very small amounts of the fragrance composition at one time, so that the scent is distributed equally on items in the housing of the household appliance.

In particular, the dispensing of the fragrance composition is linked to the determination of a change in the position of the mobile dispensing device in the main cavity of the household appliance. For the first dose of fragrance composition that is dispensed, it is possible to determine that the cleaning cycle entered a rinse cycle. Then, further dispensing of the fragrance composition occurs when a change in the position of the mobile dispensing device is determined.

According to an embodiment, the method may further comprise:

- determining a change in a distribution of items around the mobile dispensing device inside the main cavity;
- dispensing a predetermined amount of the at least one portion of the fragrance composition into the main cavity upon determining the change in the distribution of items.

The determination of a change in the distribution of items around the mobile dispensing device can for example occur by noticing a change in the magnetic field in the main cavity of the appliance, the temperature in the main cavity of the appliance, the distribution of light in the infrared visible or ultra violet spectrum around the mobile dispensing device, or by measuring a difference in the tensile forces exerted by items on the mobile dispensing device.

According to an embodiment, the detergent comprising at least one surfactant, the method may further comprise:

determining a concentration of surfactants inside the main cavity of the household appliance;

dispensing the at least one portion of the fragrance composition when the determined concentration of surfactants is below a predetermined threshold.

By making sure the concentration of surfactants in the main cavity of the household appliance is below a predetermined threshold, the release of the fragrance composition can be timed without risking any dissolution by the remaining surfactants. A predetermined threshold can for example be less than about 0.1 g per liter of water or less than about 100 ppm.

According to an embodiment, the detergent comprising at least one surfactant, the method may further comprise:

determining a change of water inside the main cavity of the household appliance;

dispensing the at least one portion of the fragrance composition when the determined change of water is indicative of a switch from the wash cycle to the at least one rinse cycle.

A change of water can be determined either from a timer which determines when the duration of the main wash cycle is over or from sensor information. Other parameters than time can be monitored to determine that change of water occurred in the housing of the household appliance and that a rinse cycle is starting. Such parameters can for example include: a change in the temperature in the main cavity, determination of vibration patterns characteristic of a change of water and/or the beginning of a rinse cycle, acoustic noise generated by the change of water.

According to an embodiment, the household appliance being a washing machine comprising a drum configured to rotate around an axis of the drum, the method may further comprise:

detecting a change in an angular position of the drum of the washing machine;

triggering the dispensing of the at least one portion of the fragrance composition from the second compartment upon detecting the change in the angular position of the drum.

Rotation of the drum of a washing machine produces a change in the position of the mobile dispensing device and also changes the distribution of items of laundry around the mobile dispensing device. As a result, detection of a change in the angular position of the drum, for example using a camera, a reading on the engine that drives the rotation of the drum, or an accelerometer, can be used to trigger the release of a small amount of fragrance composition into the main cavity of the household appliance.

According to an embodiment, the main cavity of the household appliance being a drum, the method further comprising:

determining a change in one among: a position of the dispensing device inside the drum, an acceleration of the dispensing device inside the drum, a magnetic field value at the dispensing device inside the drum;

dispensing the at least one portion of the fragrance composition when the determined change is above a predetermined value.

The predetermined value can be any value above 0. For example, a change in the angle of rotation of the mobile device above about 45°, a change in position that is above about 1 cm, or a change in magnetic field that is above about 1 mGauss to about 1000 mGauss could be used as indicators. In essence, the predetermined value is set by the sampling capabilities of the sensor or other technical means that are used to estimate or measure the change in the position of the mobile dispensing device in the household appliance.

It is to be further noted that changes may not only be measured based on a value provided by a sensor, but also deduced based on the knowledge of the current cycle run by the household appliance. In particular, rotations of a drum can be predicted based on the timing of the cycle.

According to an embodiment, the method may further comprise:

mixing the at least one portion of the fragrance composition with a solvent prior to dispensing the at least one portion of the fragrance composition into the main cavity.

The solvent with which the fragrance composition is mixed can for example include water, or a dipropylene glycol.

The present disclosure also relates to a mobile dispensing device configured to be placed inside a main cavity of a household appliance and configured to dispense a fragrance composition into the main cavity during a cleaning cycle of the household appliance, the cleaning cycle comprising at least a wash cycle during which a detergent is dispensed into the main cavity and at least one rinse cycle, the mobile dispensing device comprising:

a first compartment comprising the detergent;

a second compartment separated from the first compartment, the second compartment comprising the fragrance composition;

at least one pump for dispensing at least one portion of the fragrance composition from the second compartment into the main cavity at least twice during the at least one rinse cycle so that a position of the mobile dispensing device in the main cavity at a first dispensing time differs from a position of the mobile device in the main cavity at a second dispensing time; and a data processing unit configured to send an activation signal to the at least one pump upon obtaining information on a change in the position of the mobile dispensing device in the main cavity.

According to an embodiment, the data processing unit may be further configured to determine an amount of fragrance composition to be dispensed.

The amount can for example be determined based on a measurement conducted during the cleaning cycle on the wash water in the household appliance or based on molecules identified in the main cavity of the household appliance during the cleaning operation. For example, a conductivity measurement can be an indication of the amount of soilings in the wash water and hence of the dirtiness of the items to be cleaned. The bigger the amount of soilings detected, the larger the amount of fragrance composition that is released.

Optical tools, such as infrared sensors or cameras can also be used to determine the amount of soilings on the items to be cleaned. The type of cleaning program that is selected is a further indication of the level of dirtiness of the items that are cleaned and of the need to dispense more or less fragrance composition to increase the impression of cleanliness at the end of the cleaning cycle. Finally, preferences selected by a user can be used to set the amount of fragrance composition that is dispensed.

According to an embodiment, the at least one pump may be a pump configured to dispense an amount of the fragrance composition corresponding to between one and one hundred microliters of the fragrance composition per activation, the pump being selected among a peristaltic pump and a micromembrane pump.

According to an embodiment, the mobile dispensing device may further comprise:

at least one sensor configured to determine a change in the position of the mobile dispensing device inside the main cavity of the household appliance, the sensor being one among: a magnetometer, an accelerometer, a camera operating in the visible range, a camera operating in the infrared range, a camera operating in the ultra violet range.

The present disclosure also relates to a kit comprising a dispensing device as described above and a fragrance composition comprising at least one fragrance compound and a cationic surfactant.

According to an embodiment, the kit further comprises:

- a concentration of the at least one fragrance compound in the fragrance composition that is above about 10%, more preferably above about 30%;
- a concentration of the cationic surfactant in the fragrance composition that is above about 20%, preferably above about 40%
- an amount of less than about 10 g, preferably less than about 2 grams of the fragrance composition that is used per cleaning cycle.

According to an embodiment, the cationic surfactant may be one among: a quaternary triethanol-methyl-ammonium compound, a quaternary diethanol-dimethyl-ammonium compound or a mixture thereof.

According to an embodiment, the fragrance composition may further comprise:

- between about 30% and about 50% of at least one fragrance compound;
- between about 30% and about 65% of a solvent;
- between about 5% and about 20% of a cationic surfactant.

The present disclosure also concerns a computer program product comprising instructions for executing a method for ordering the dispensing of a fragrance composition into a main cavity of a household appliance during a cleaning cycle of the household appliance, the cleaning cycle comprising a wash cycle during which a detergent is dispensed into the main cavity and at least one rinse cycle, the detergent being comprised in a first compartment of a mobile dispensing device configured to be movably arranged inside the main cavity of the household appliance, the method comprising:

- determining a change in the position of the mobile dispensing device in the main cavity; and
- triggering a signal for activating dispensing of at least one portion of the fragrance composition from a second compartment separated from the first compartment into the main cavity at least twice during the at least one rinse cycle so that a position of the mobile dispensing device in the main cavity at a first dispensing time differs from a position of the mobile device in the main cavity at a second dispensing time.

In other words, the present disclosure concerns a non-transitory computer readable storage medium having stored thereon a computer program comprising instructions for execution of the method described above.

BRIEF DESCRIPTION OF THE DRAWINGS

The present disclosure will hereinafter be described in conjunction with the following drawing figures, wherein like numerals denote like elements, and.

DETAILED DESCRIPTION

The present disclosure provides a method for dispensing a fragrance composition into the main cavity of a household appliance during a cleaning cycle run by the appliance. In particular, the present disclosure enables a homogeneous and efficient distribution of the fragrance composition on items found in the appliance so that all items benefit form a pleasant scent, and accumulation of the fragrance composition in localized areas of the items is avoided. The present disclosure also provides a mobile dispensing device that is capable of implementing the method of the present disclosure. The mobile dispensing device can be found as a kit further comprising the fragrance composition suitable for generating the desired scent while at the same time using only very small amounts of the fragrance composition per cleaning cycle. The kit can be found in the form of a dispensing device and refill cartridges.

In order to dispense a fragrance composition equally across items found in the main cavity of a household appliance, the present disclosure times the release of the fragrance composition so that small amounts thereof are dispensed only if the position of the dispensing device, arranged inside the cavity of the household appliance, changes.

Figure 1:
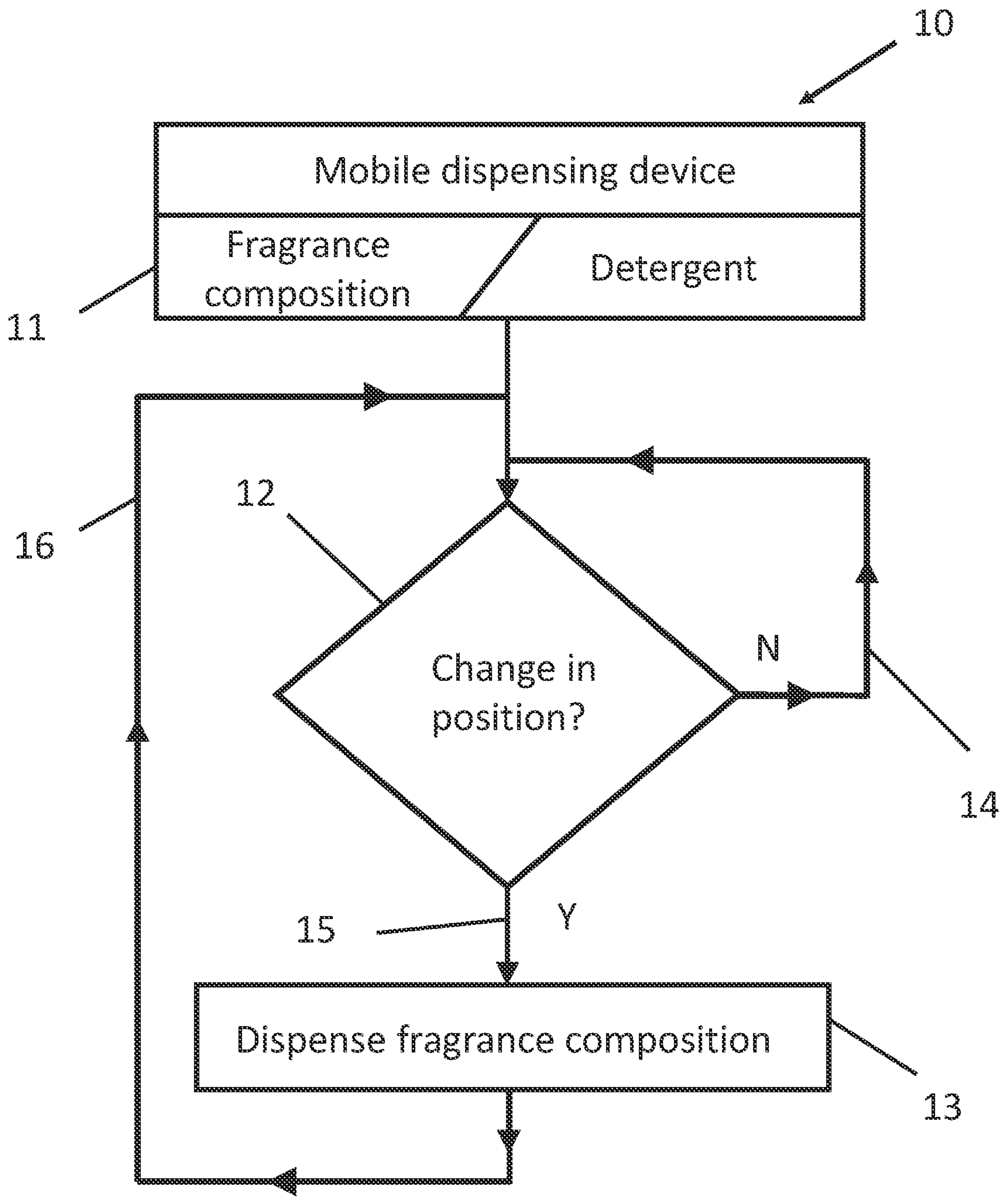
FIG. 1 shows a simplified workflow of a method according to an exemplary embodiment.

FIG. 1 illustrates an exemplary flowchart of the method 10 of the present disclosure according to an embodiment.

First, a mobile dispensing device stores 11 a detergent in a first compartment and a fragrance composition in a second compartment that is separated from the first compartment. This storage can for example occur in cartridges arranged inside the mobile dispensing device.

During the cleaning cycle, the change in the position of the mobile dispensing device inside the household appliance is determined 12. This determination step can be implanted for example by a data processing unit that is on the mobile dispensing device or by a remote data processing unit, located either in the household appliance, on a distant server or in a mobile data processing device such as a phone or computer.

No dispensing of the fragrance composition occurs if the position of the mobile dispensing device does not change. This is symbolized by arrow 14 on the flowchart of FIG. 1. The first dispensing can however occur at any time, as a change in position can only be determined based on a first position of the mobile dispensing device at which an amount of the fragrance composition was dispensed.

If a first position of the mobile dispensing device at which an amount of the fragrance composition was dispensed differs from a second position of the mobile dispensing device, then another amount of the fragrance composition can be dispensed into the main cavity of the household appliance. This is symbolized by arrow 15 on the flowchart of FIG. 1. It should be noted that the change in position is only a required condition for dispensing a further amount of the fragrance composition. Further conditions can also be set, such as determining that a temperature inside the main cavity is below a threshold value indicative of a change of water and the beginning of a rinse cycle or identifying a rinse cycle in the cleaning cycle from vibration patterns of the household appliance, or determining that an amount of surfactants inside the main cavity of the household appliance is below a predetermined threshold.

A rinse cycle, be it an intermediary rinse cycle or the final rinse cycle in the case of a washing machine or dishwasher, are preferred times for dispensing the fragrance composition. Measurement of the concentration of surfactants inside the main cavity of the appliance can further improve the efficiency of the fragrance composition. Since about 1 to about 3 grams of surfactants are typically dispensed during a wash cycle in a household appliance, it is advantageous to dispense the fragrance composition when the amount of surfactants is below about 0.5 grams, or about 500 parts per million in the wash water of the household appliance. Any other numerical threshold value can be set for determining when to dispense the fragrance composition without having it dissolved by the remaining surfactants in the main cavity of the appliance.

Sensors can also be used to determine when a change of water occurs in the main cavity of the household appliance. A change in temperature, be it water temperature or temperature of air inside the main cavity, can be an indicator of such an event. The change of water and the beginning of a rinse cycle can further be indicated by vibration patterns of the household appliance, or simply by measuring the time that lapsed since the beginning of the main wash cycle.

The dispensing of the fragrance composition can further occur upon determining a change in a distribution of items around the mobile dispensing device. This change can for example be determined based on an estimated or determined movement of the mobile dispensing device or based on information provided by an optical sensor for example.

Typically, an amount comprised between about 1 μl and about 100 μl of the fragrance composition is dispensed per activation. The activation process can typically be implemented by a pump.

The dispensing of the fragrance composition can be repeated more than once, in particular more than twice, to ensure a more homogeneous distribution of the scent across the items in the main cavity of the household appliance. Arrow 16 on FIG. 1 shows that the step of determining 14 a change in the position of the mobile dispensing device and the step of dispensing 13 the fragrance composition can be repeated. The process can be stopped after a preprogrammed number of activations of the dispending unit of the mobile dispensing device, or when a fixed predetermined amount of the fragrance composition was dispensed. A counter in the cartridge measuring the amount of fragrance composition that was dispensed, or a counter counting the number of times that the dispensing mechanism was activated can be used to determine when to stop dispensing the fragrance composition.

Figure 2:
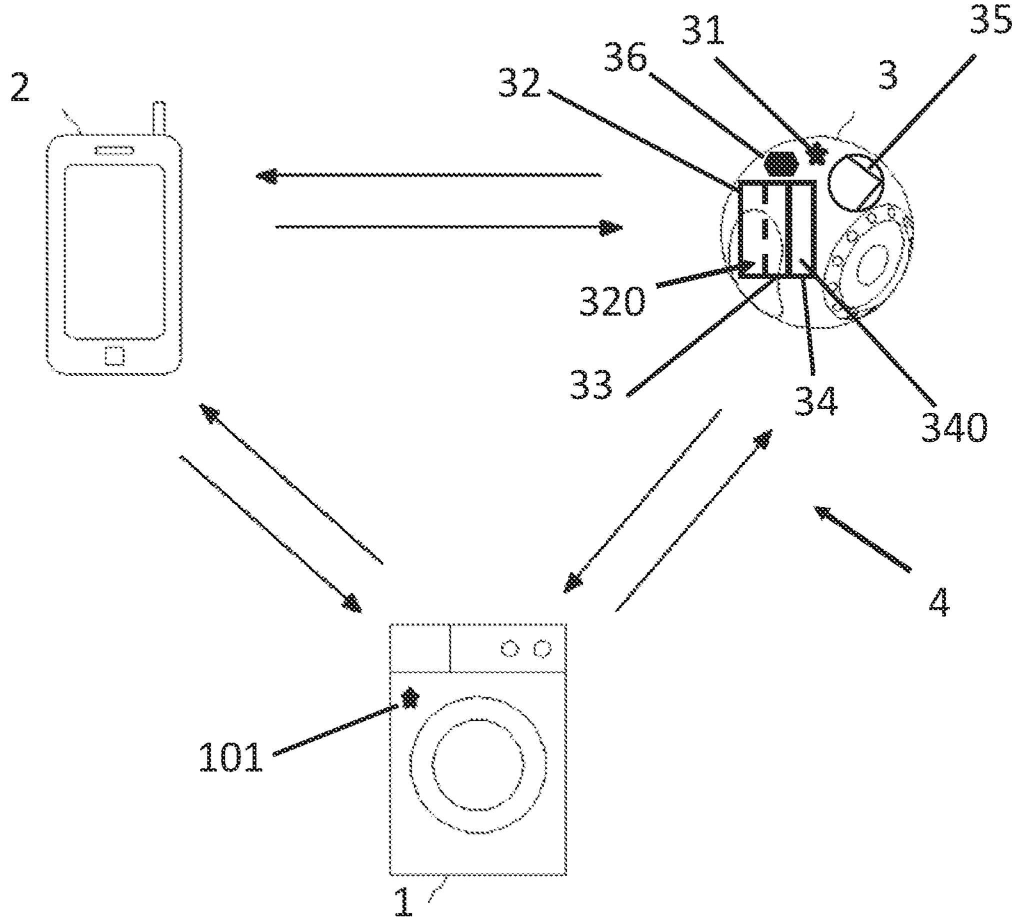
FIG. 2 is a schematic representation of a system comprising a mobile dispensing device according to an embodiment.

FIG. 2 is a schematic illustration of a system 4 that includes a household appliance 1, a mobile dispensing device 3 and a calculating unit 2 such as a phone, tablet, computer or server. All or only some of these elements may be able to exchange information with each other.

The mobile dispensing device 3 is illustrated in a semi-transparent way to illustrate the presence of compartments such as cartridges, a data processing unit 36 and a pump 35 in the mobile dispensing device 3.

A first compartment 34 typically comprises the detergent 340. A second compartment 320 comprises the fragrance composition. This second compartment 320 may actually be formed of more than one cartridge the content of which are either mixed before the dispensing action or during the dispensing action. Alternatively, the second compartment 320 may be formed of only one cartridge comprising a mix of at least one fragrance compounds and at least one solvents and auxiliary agents such as at least one cationic surfactants.

In the example of FIG. 2, the second compartment 320 comprises a first cartridge 32, typically comprising the at least one fragrance compound of the fragrance composition, and a second cartridge 34, typically comprising the at least one solvent, such as dipropylene glycol, and the at least one cationic surfactant.

Suitable examples of cationic surfactants are quaternary ammonium compounds of formulas (I) and (II), (I)

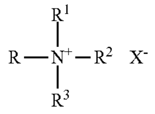

(II)

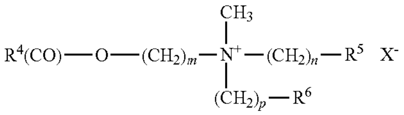

wherein in (I) R and $R^1$ represent an acyclic alkyl residue having 12 to 24 carbon atoms, $R^2$ represents a saturated $C_1$-$C_4$ alkyl or hydroxyalkyl residue, $R^3$ either is identical to R, $R^1$, or $R^2$ or represents an aromatic residue. $X^-$ represents a halide, methosulfate, methophosphate, or phosphate ion or mixtures thereof. Examples of cationic compounds of formula (I) are didecyl dimethyl ammonium chloride, ditallow dimethyl ammonium chloride, and dihexadecyl ammonium chloride.

Compounds of formula (II) are so-called esterquats. Esterquats are characterized by the good biodegradability thereof and are preferred in the context of the present disclosure. Here, $R^4$ represents an aliphatic alkyl residue having 12 to 22 carbon atoms and having 0, 1, 2, or 3 double bonds; $R^5$ represents H, OH, or $O(CO)R^7$, $R^6$ represents H, OH, or $O(CO)R^8$ independently of $R^5$, wherein $R^7$ and $R^8$ represent an aliphatic alkyl residue having 12 to 22 carbon atoms and having 0, 1, 2, or 3 double bonds independently of each other. m, n, and p can have the value 1, 2, or 3 independently of each other. $X^-$ can be a halide, methosulfate, methophosphate, or phosphate ion or mixtures thereof. Compounds that contain the group $O(CO)R^7$ for $R^5$ and alkyl residues having 16 to 18 carbon atoms for $R^4$ and $R^7$ are preferred. Compounds in the case of which $R^6$ additionally represents OH are especially preferred. Examples of compounds of formula (II) are methyl-N-(2-hydroxyethyl)-N,N-di(tallow acyl-oxyethyl)ammonium methosulfate, bis-(palmitoyl)-ethyl hydroxyethyl methylammonium methosulfate, or methyl-N,N-bis(acyloxyethyl)-N-(2-hydroxyethyl)ammonium methosulfate.

Especially preferred cationic surfactants are esterquats. The term “esterquat” as used herein refers to esters of quaternary ammonium polyols, in particular quaternary ammonium diols and/or triols, such as triethanolmethylammonium or diethanol dimethylammonium, with fatty acids. Especially preferred esterquats are for example the quaternary triethanol-methyl-ammonium compounds and the quaternary diethanol-dimethyl-ammonium compounds. Preferred esterquats according to the present disclosure are commercially available under the tradename Rewoquat®, e.g. Rewoquat® WE18, Rewoquat® WE15, Rewoquat® WE 28, Rewoquat® W 75, Rewoquat® WE 20, Rewoquat® W 575.

The mobile dispensing device 3 may further comprise at least one sensor 31. This sensor can for example be an accelerometer, capable of determining a rotation of the drum of a washing machine or a rotation of the dispensing device in any main cavity of a household appliance 1. The sensor 31 may also be a magnetometer, capable of determining a change in the magnetic field around the mobile dispensing device 3. The sensor 31 may also be a camera, or any other optical sensor capable of detecting a change in light around the mobile dispensing device 3 in the visible or the infrared or the ultraviolet ranges. The visible range is typically defined as comprising wavelengths between about 400 nm and about 750 nm. The infrared range is typically defined as comprising wavelengths between about 750 nm and about 1500 nm. The ultraviolet range is typically defined as comprising wavelengths between about 100 nm and about 400 nm. The sensor 31 may also be one or more electrodes capable of measuring the conductivity of the wash water in the cavity of the appliance. The mobile dispensing device 3 may comprise more than one of the sensors 31 listed above.

The sensor 31 may also not be located on the mobile dispensing device 3 itself. A sensor 101 can be placed on the household appliance and communicate its readings or generate any other signal indicative of a certain measured or determined value to the mobile dispensing device 3 and/or the calculating unit 2.

For example, instead of measuring accelerations at the mobile dispensing device 3, the sensor 101 of the household appliance 1 can detected rotations of a drum or other spinning elements in the appliance. This information can be used to determine whether a change in the position of the mobile dispensing device occurred.

The determination of the change in the position of the mobile dispensing device 3 can happen in the form of a change in the angular position of the drum of the appliance. When the drum is found to be in a new angular position, a signal can be generated either by the household appliance 1, the calculating unit 2 or a data-processing unit 36 of the mobile dispensing device 3 to trigger dispensing of an amount of the fragrance composition.

The data-processing unit 36 is in particular configured to send an activation signal to the at least one pump 35 upon obtaining information on a change in the position of the mobile dispensing device, optionally upon the verification of further conditions for triggering such an activation as discussed above.

The data-processing unit 36 may also further be configured to determine the amount of fragrance composition that is to be dispensed based on information provided by either sensors 31, 101, or information provided by a user or information determined based on the parameters of the cleaning cycle run by the household appliance 1. The same task can also be performed by the calculating unit 2 or the household appliance 1.

The at least one pump 35 can typically be a peristaltic pump or a micromembrane pump which is adapted to withstand strong accelerations in the case the main cavity of the household appliance 1 is a rotating drum. There can also be more than one pump 35 in the mobile dispensing device. In particular, each constituent of each cartridge may be connected to a different pump to avoid contamination of the constituents during the dispensing action.

The mobile dispensing device 1 may also comprise more than 2 or 3 compartments. Further cartridges can include further cleaning agents such as bleach, softeners.

Figure 3:
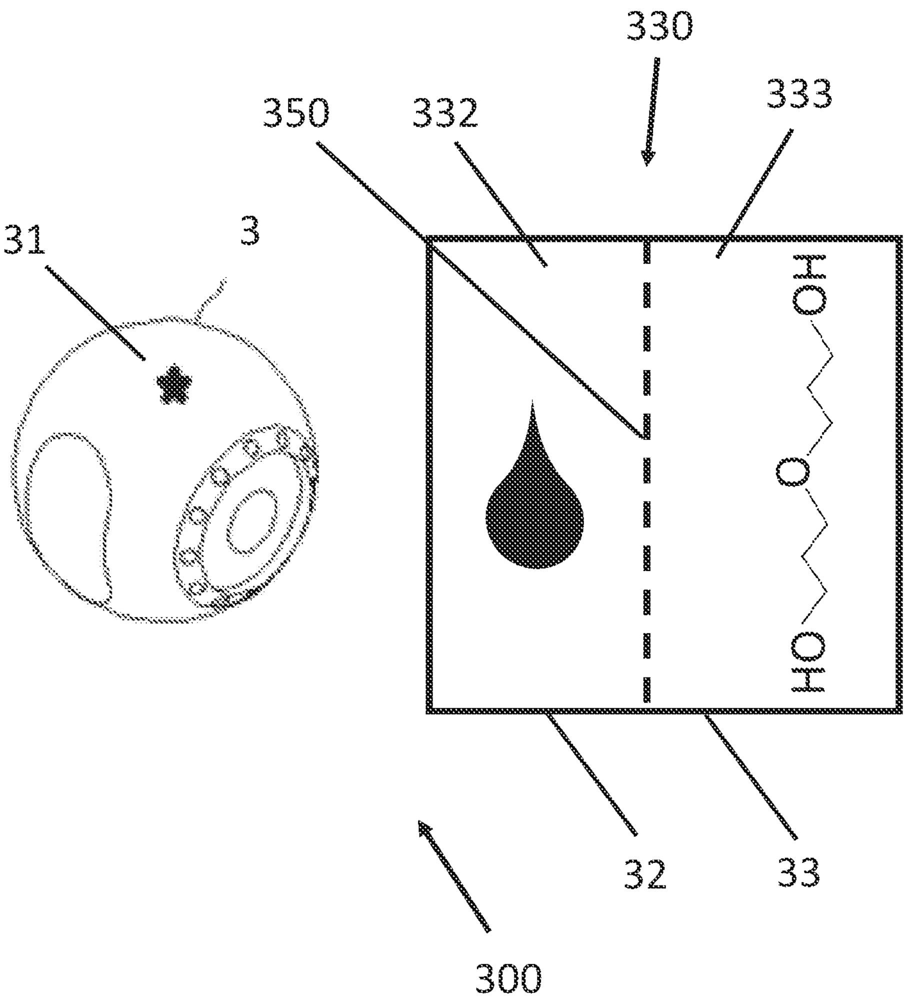
FIG. 3 is a schematic representation of a kit comprising a mobile dispensing device and a refill for a fragrance composition according to an embodiment.

FIG. 3 is a schematic view of a kit comprising the mobile dispensing device 3 of FIG. 2 and a fragrance composition 330. The fragrance composition 330 can for example be contained in one or more cartridges 32, 33. The fragrance composition 330 can typically comprise at least one fragrance compound 332 and at least one cationic surfactant 333. Cartridges 32, 33 can be separated by a membrane 350 that can be breakable upon demand to mix the content of both cartridges 32, 33. It is also possible that no such membrane 350 is present and cartridges are isolated from each other. Alternatively, membrane 350 may be absent and all constituents of the fragrance composition are already premixed. In this alternative, there may still be one or more further additional cartridges comprising for example a solvent with which the fragrance composition is further mixed during the dispensing operation.

Typically, the concentration of the at least one fragrance compound in the fragrance composition is above about 10 weight-%, more preferably above about 30 weight-%; the concentration of the cationic surfactant in the fragrance composition is above about 20 weight-%, preferably above about 40 weight-% and/or an amount of less than about 10 g, preferably less than about 2 grams of the fragrance composition is used per cleaning cycle.

Advantageously, the fragrance composition comprises between about 30 weight-% and about 50 weight-% of at least one fragrance compound; between about 30 weight-% and about 65 weight-% of at least one solvent such as for example dipropylene glycol and between about 5 weight-% and about 20 weight-% of at least one cationic surfactants such as for example an esterquat compound.

It has been shown, in particular that the use of at least one fragrance compound with an esterquat compound as an auxiliary agent provides a boost to the intensity of the fragrance composition on the dry laundry. This occurs with very low dosages of esterquats, and for a total amount dispensed below about 1 ml.

EXAMPLES

Tests were conducted on a Bosch Logixx washing machine (reference WAS284DE/55), with a water hardness of 16 dH (German water hardness measuring unit "Grad Deutsche Harte"). The program run by the machine was set at 40° C., for cotton, with 3 rinse cycles. 2.5 kg of laundry items including 4 T-shirts, 20 cm×20 cm towels were introduced into the machine. 15 mL of a cleaning agent A were used, with and without fragrance compositions.

In the first series of tests (A1-A3) the fragrance composition A comprises 47% of a fragrance compound and 53% of dipropylene glycol.

In the second test (E1) the fragrance composition B comprises 42.3% of a fragrance compound (same as in A1-A3), 47.7% of dipropylene glycol, 10% Rewoquat® WE18 (Esterquat® 90%).

Results are provided in table 1 below.

TABLE 1

| Test | Conditions of the test | Scent intensity (a.u.) measured on dry laundry items |
|---|---|---|
| A1 | 15 mL of agent A with no fragrance composition | 2 |
| A2 | 15 mL of agent A with fragrance composition A | 3 |
| A3 | 15 mL of agent A with fragrance composition A: 1 ml of fragrance composition dispensed in $2^{nd}$ rinse cycle in 10 sequences of 100 μL each. | 4 |
| E1 | 15 mL of agent A with fragrance composition B: 1 ml of fragrance composition dispensed in $2^{nd}$ rinse cycle in 10 sequences of 100 μL each. | 5.5 |

The above table shows that the use of auxiliary agents can boost the effect of the scent perceived on dry laundry items, since the value of the scent intensity in test E (5.5) is significantly higher than the value 4 obtained in similar conditions without this auxiliary agent (test A3).

The steps of the examples and embodiments described above can be implemented by a processor such as a computer. A computer program product comprising steps of the above-described method can be used to implement the method on a computer.

It is possible to store a computer program comprising instructions to implement the method of the present disclosure on different non-transitory computer readable storage mediums. These could for example comprise a processor or chip, FPGA (field programable gate array), an electronic circuit comprising several processors or chips, a hard drive, a flash or SD card, a USB stick, a CD-ROM or DVD-ROM or Blue-Ray disc, or a diskette.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A mobile dispensing device configured to be placed inside a main cavity of a household appliance and configured to dispense a fragrance composition into the main cavity during a cleaning cycle of the household appliance, the cleaning cycle comprising at least a wash cycle during which a detergent is dispensed into the main cavity and at least one rinse cycle, the mobile dispensing device comprising:

a first compartment comprising the detergent;

a second compartment separated from the first compartment, the second compartment comprising the fragrance composition;

at least one pump configured, in response to an activation signal, to dispense at least a portion of the fragrance composition from the second compartment into the main cavity; and a data processing unit configured to (i) receive information regarding a change in position of the mobile dispensing device in the main cavity and (ii) send the activation signal to the at least one pump at least twice during the at least one rinse cycle such that the position of the mobile dispensing device in the main cavity at a first dispensing time differs from the position of the mobile dispensing device in the main cavity at a second dispensing time.

2. The mobile dispensing device according to claim 1, wherein the data processing unit is further configured to determine an amount of fragrance composition to be dispensed.

3. The mobile dispensing device according to claim 1, wherein the at least one pump is a pump configured to dispense an amount of the fragrance composition corresponding to between one and one hundred microliters of the fragrance composition per activation, the pump being selected among a peristaltic pump and a micromembrane pump.

4. The mobile dispensing device according to claim 1, further comprising:

at least one sensor configured to determine the change in the position of the mobile dispensing device inside the main cavity of the household appliance, the sensor being one of a magnetometer, an accelerometer, a camera operating in the visible range, a camera operating in the infrared range, and a camera operating in the ultra violet range.

5. A kit comprising a dispensing device according to claim 1 and a fragrance composition comprising at least one fragrance compound and at least one cationic surfactant.

6. The kit according to claim 5, wherein:

the concentration of the at least one fragrance compound in the fragrance composition is above 10 weight-%;

the concentration of the at least one cationic surfactant in the fragrance composition is above 20 weight-%; and/or an amount of less than 10 g of the fragrance composition is used per cleaning cycle.

7. Kit according to claim 5, comprising a cationic surfactant selected from quaternary triethanol-methyl-ammonium compounds and quaternary diethanol-dimethyl-ammonium compounds.

8. Kit according to claim 5, wherein the fragrance composition comprises:

from about 30 weight-% to about 50 weight-% of the at least one fragrance compound;

from about 30 weight-% to about 65 weight-% of at least one solvent; and from about 5 weight-% to about 20 weight-% of the at least one cationic surfactant.

* * * * *